United States Patent
Tosato et al.

(10) Patent No.: US 10,439,693 B2
(45) Date of Patent: Oct. 8, 2019

(54) WIRELESS COMMUNICATION METHODS AND APPARATUS

(71) Applicant: KABUSHIKI KAISHA TOSHIBA, Tokyo (JP)

(72) Inventors: Filippo Tosato, Bristol (GB); Magnus Stig Torsten Sandell, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/125,122

(22) PCT Filed: Aug. 8, 2014

(86) PCT No.: PCT/GB2014/052436
§ 371 (c)(1),
(2) Date: Sep. 9, 2016

(87) PCT Pub. No.: WO2016/020628
PCT Pub. Date: Feb. 11, 2016

(65) Prior Publication Data
US 2017/0141828 A1    May 18, 2017

(51) Int. Cl.
*H04B 7/06* (2006.01)
*H04B 7/0413* (2017.01)

(52) U.S. Cl.
CPC ......... *H04B 7/0617* (2013.01); *H04B 7/0413* (2013.01); *H04B 7/0626* (2013.01); *H04B 7/0663* (2013.01)

(58) Field of Classification Search
CPC .................................................. H04B 7/0617
USPC .......................................................... 375/267
See application file for complete search history.

(56) References Cited

U.S. PATENT DOCUMENTS 8,254,359 B2    8/2012   Li et al.
8,743,857 B2    6/2014   Li et al.
(Continued)

FOREIGN PATENT DOCUMENTS

| JP | 2011-508522 A | 3/2011 |
| WO | WO 2014/003898 A1 | 1/2014 |
| WO | WO 2014/052879 A1 | 4/2014 |

OTHER PUBLICATIONS

International Search Report form the European Patent Office in corresponding International Application No. PCT/GB2014/052436 dated Aug. 18, 2015.
(Continued)

*Primary Examiner* — Lihong Yu
(74) *Attorney, Agent, or Firm* — Finnegan, Henderson, Farabow, Garrett & Dunner, L.L.P.

(57) ABSTRACT

In an embodiment a method of feeding back channel state information from a beamformee device to a beamformer device is disclosed. The method comprises receiving, at a plurality of antennas of the beamformee device, signals from the beamformer device; constructing a beamforming matrix, the beamforming matrix spanning a vector subspace and indicating the signals received by each of the plurality of antennas of the beamformee device; determining a first feedback matrix that spans the vector subspace of the beamforming feedback matrix such that it can be compressed with a lower number of non-zero coefficients than the beamforming feedback matrix; compressing the first feedback matrix into a plurality of coefficients; and transmitting an indication of the plurality of coefficients to the beamformer device.

13 Claims, 6 Drawing Sheets

(56) References Cited

U.S. PATENT DOCUMENTS

| | | | |
|---|---|---|---|
| 2009/0161646 A1* | 6/2009 | Li | H04B 7/0417 |
| | | | 370/342 |
| 2012/0269280 A1 | 10/2012 | Li et al. | |
| 2012/0314791 A1 | 12/2012 | Zhang et al. | |
| 2013/0294533 A1 | 11/2013 | Kim et al. | |
| 2013/0346755 A1* | 12/2013 | Nguyen | H04L 9/008 |
| | | | 713/176 |
| 2014/0093005 A1* | 4/2014 | Xia | H04B 7/0617 |
| | | | 375/267 |

OTHER PUBLICATIONS

Written Opinion of the International Search Authority from the European Patent Office in corresponding International Application No. PCT/GB2014/052436 dated Aug. 18, 2015.

F. Tosato, "Frequency-Selective Channel State Feedback in Multiuser MIMO Downlink," IEEE Transaction Communication (Aug. 2012), 60:2230-39.

Porat et al., "Improved MU-MIMO Performance for Future 802.11 Systems Using Differential Feedback," Workshop on Information Theory and Application (2013), pp. 1-5.

Xia et al., "Improved Transmit Beamforming for WLAN Systems," 2013 IEEE Wireless Communications and Networking Conference (2013), pp. 3500-3505.

International Preliminary Report on Patentability issued by the International Bureau of WIPO dated Feb. 23, 2017 for International Application No. PCT/GB2014/052436.

* cited by examiner

WIRELESS COMMUNICATION METHODS AND APPARATUS

FIELD

Embodiments described herein relate generally to the feedback of beamforming information in multiple-input and multiple-output (MIMO) wireless communications.

BACKGROUND

Single-user (SU) MIMO and downlink multi-user (DL-MU) MIMO beamforming are techniques widely adopted in WLAN standards such as IEEE 802.11n and 802.11ac. These techniques are used by a station with multiple antennas (the beamformer) to steer signals in the spatial domain using information of the channel state. In SU-MIMO all the spatial streams are intended for a single destination (beamformee), whilst in DL-MU-MIMO different groups of spatial streams are directed to a number of different receivers. In both the single and multi-user techniques, the beamformer calculates a steering matrix from the beamforming feedback matrix reported by each of the beamformees.

BRIEF DESCRIPTION OF THE DRAWINGS

In the following, embodiments of the present invention will be described by way of example with reference to the drawings in which.

DETAILED DESCRIPTION

Figure 1:
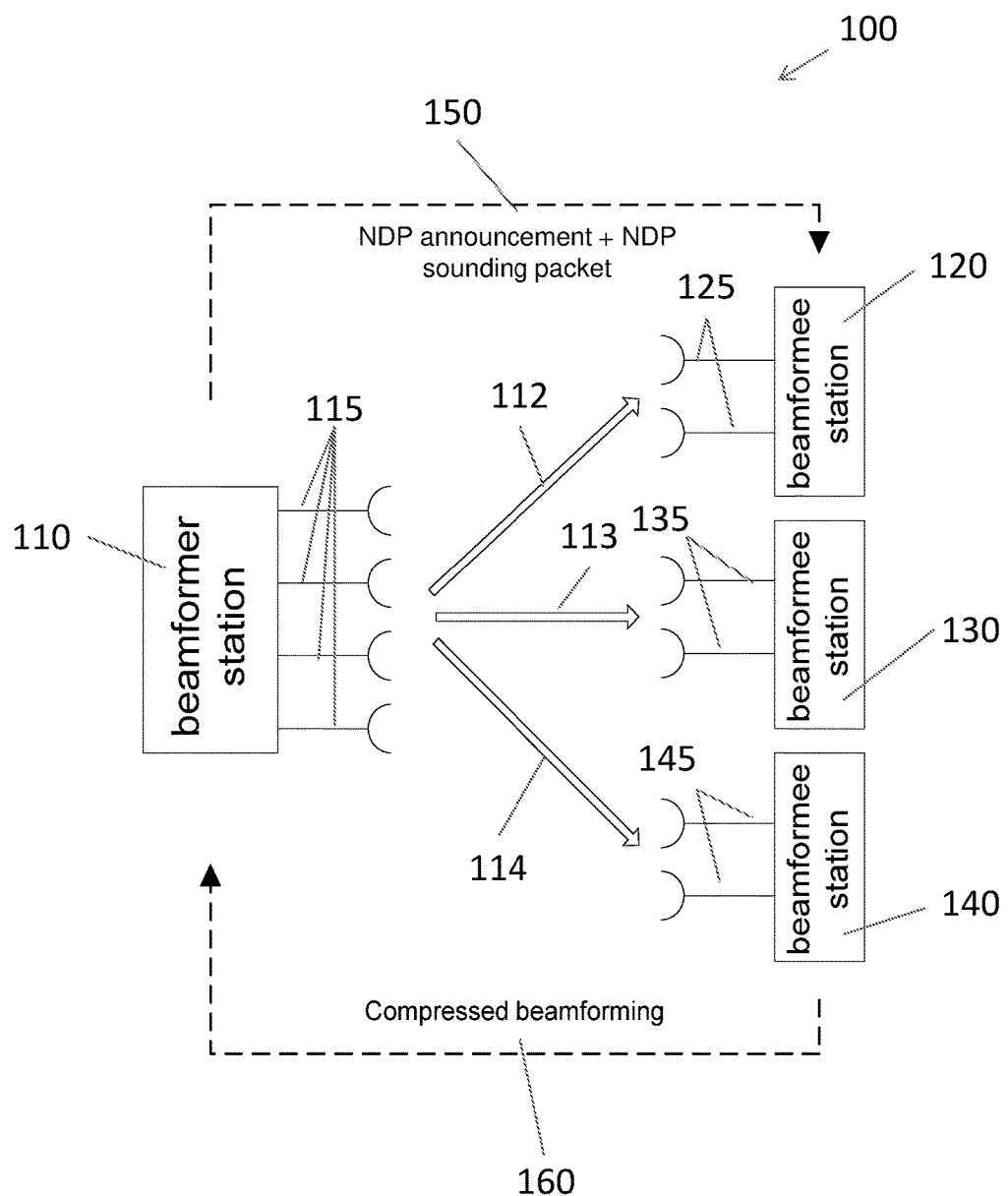
FIG. 1 shows a wireless network according to an embodiment.

In an embodiment a method of feeding back channel state information from a beamformee device to a beamformer device is disclosed. The method comprises receiving, at a plurality of antennas of the beamformee device, signals from the beamformer device; constructing a beamforming matrix, the beamforming matrix spanning a vector subspace and indicating the signals received by each of the plurality of antennas of the beamformee device; determining a first feedback matrix that spans the vector subspace of the beamforming feedback matrix such that it can be compressed with a lower number of non-zero coefficients than the beamforming feedback matrix; compressing the first feedback matrix into a plurality of coefficients; and transmitting an indication of the plurality of coefficients to the beamformer device.

In an embodiment determining the first feedback matrix comprises determining the product of the beamforming matrix with a unitary matrix by optimising the unitary matrix to minimise the number of coefficients required to represent the feedback matrix.

In an embodiment compressing the first feedback matrix into a plurality of coefficients comprises decomposing the first feedback matrix into a plurality of angular coefficients.

In an embodiment compressing the first feedback matrix into a plurality of angular coefficients comprises determining a cosine-sine decomposition of the first feedback matrix.

In an embodiment the method further comprises transmitting an indication of the unitary matrix to the beamformer device.

In an embodiment the method further comprises determining the indication of the unitary matrix as a Givens decomposition of the product of the Hermitian transpose of the unitary matrix with a diagonal matrix.

In an embodiment a computer readable carrier medium carries processor executable instructions which when executed on a processor cause the processor to carry out a method as described above.

In an embodiment a beamformee device is disclosed. The beamformee device comprises a plurality of antennas configured to receive signals from a beamformer device, and transmit an indication of a plurality of coefficients to the beamformer device, The beamformee device is configured to construct a beamforming matrix indicating the signals received by each of the plurality of antennas of the beamformee device; determine a first feedback matrix that spans the vector subspace of the beamforming feedback matrix such that it can be compressed with a lower number of non-zero coefficients than the beamforming feedback matrix; and compress the first feedback matrix into the plurality of coefficients.

In an embodiment the beamformee device is configured to determine the first feedback matrix by determining the product of the beamforming matrix with a unitary matrix by optimising the unitary matrix to minimise the number of coefficients required to represent the feedback matrix.

In an embodiment the beamformee device is configured to compress the first feedback matrix into a plurality of coefficients by decomposing the first feedback matrix into a plurality of angular coefficients.

In an embodiment the beamformee device is configured to compress the first feedback matrix into a plurality of angular coefficients by determining a cosine-sine decomposition of the first feedback matrix.

In an embodiment the plurality of antennas are further configured to transmit an indication of the unitary matrix to the beamformer device.

In an embodiment the beamformee device is configured to determine the indication of the unitary matrix as a Givens decomposition of the product of the Hermitian transpose of the unitary matrix with a diagonal matrix.

In an embodiment a method, in a beamforming device of reconstructing a feedback matrix is disclosed. The method comprises receiving, from a beamformee device, an indication of a plurality of coefficients; and determining from the plurality of coefficients a first feedback matrix indicating a product of a beamforming matrix determined by the beamformee device and a unitary matrix.

In an embodiment a beamforming method is disclosed. The beamforming method comprises reconstructing a feedback matrix for each of a plurality of beamformee devices; combining the reconstructed feedback matrices to form a channel matrix; determining a precoding matrix from the channel matrix; and transmitting signals to the beamformee devices using the precoding matrix.

In an embodiment the method further comprises receiving an indication of the unitary matrix from the beamformee device.

In an embodiment a computer readable carrier medium carries processor executable instructions which when executed on a processor cause the processor to carry out a method as described above.

In an embodiment a beamforming device is disclosed. The beamforming device is configured to receive, from a beamformee device, an indication of a plurality of coefficients; and determine from the plurality of coefficients a first feedback matrix indicating a product of a beamforming matrix determined by the beamformee device and a unitary matrix.

In an embodiment the beamforming device comprises a plurality of antennas and is further configured to reconstruct, a feedback matrix for each of a plurality of beamformee devices; combine the reconstructed feedback matrices to form a channel matrix; determine a precoding matrix from the channel matrix; and transmitting signals to the beamformee devices using plurality of antennas according to the precoding matrix.

FIG. 1 shows a wireless network 100 according to an embodiment. The wireless network is configured as a multiple user MIMO system. The wireless network 100 comprises a beamformer station 110, a first beamformee station 120, a second beamformee station 130 and a third beamformee station 140. The beamformer station 110 comprises a plurality of antennas 115. Each of the beamformee stations comprises a plurality of antennas. The first beamformee station 120 comprises a plurality of antennas 125. The second beamformee station 130 comprises a plurality of antennas 135. The third beamformee station 140 comprises a plurality of antennas 145.

The beamformer station 110 uses a steering matrix which specifies weights for different antennas of the plurality of antennas 115 to steer signals in the spatial domain using channel state information received from the beamformee stations. As shown in FIG. 1, a first spatial signal 112 is spatially steered for the first beamformee station 120, a second spatial signal 113 is spatially steered for the second beamformee station 130, and a third spatial signal 114 is spatially steered for the third beamformee station 140.

In order to determine the steering matrix for each of the beamformee stations, the beamformer station requires beamforming information from each of the beamformee stations. This information is determined by the beamformer station sending a non-data packet (NDP) announcement and non-data packet (NDP) sounding packet 150 to the beamformee stations. In response to the NDP announcement and NDP sounding packet 150, the beamformee stations send compressed beamforming information 160 to the beamformer station 110. The determination and form of the compressed beamforming information 160 is described in more detail below.

To reduce the amount of feedback information, the beamforming orthonormal column feedback matrix $V_{k,u}$ calculated by the beamformee u for subcarrier k is compressed in the form of angles by using the Givens decomposition. The same feedback mechanism is used for both DL-SU and DL-MU MIMO, which consists in representing the actual matrix $V_{k,u}$, with the smallest possible number of real-valued coefficients and quantising them uniformly.

Note that, because the absolute phase of each column of $V_{k,u}$ is not needed at the beamformer, the matrix columns are multiplied by some convenient phase shift values before applying the Givens decomposition. Hence we can assume, without loss of generality, that the last row of $V_{k,u}$ are nonnegative real numbers.

A property of the Givens decomposition is that it allows $17_{k,u}$ to be represented by $N_a/2$ real parameters $\{\phi\}$ in the range $[0,2\pi)$ and $N_a/2$ real parameters $\{\psi\}$ in the range $[0,\pi/2]$, where $N_a$ is the total number of parameters used in the representation. Hence by using $b_\psi$, and $b^\Phi = b_\psi + 2$ bits for the two angular parameters, respectively, these can be quantised uniformly with the same granularity.

In embodiments the number of angular parameters used in the representation of the beamforming feedback matrix is reduced whilst 1) improving users' spatial separation capability of the beamformer and 2) maintaining the same quantised representation of the coefficients as in existing feedback in IEEE802.11ac and IEEE801.11n. Moreover, the new representation can be combined with a Givens decomposition to provide a two-layer representation of the feedback matrix.

In the following we will drop the subcarrier and user indices when describing the representation of the beamforming feedback matrix as the same procedure applies to any subcarrier and user. We also denote the number of rows and columns of V as $N_r$ and $N_c$ respectively. Note that, in general, $N_r$ equals the number of transmit antennas and $N_c$ the number of spatial streams of the user performing the feedback operation.

In a compressed representation, the $N_r \times N_c$ beamforming orthonormal column feedback matrix V found by the beamformee is represented by means of a Givens decomposition as follows $$V = \left[ \prod_{i=1}^{\min\{N_r,N_r-1\}} \left[ D_i\left(1_{i-1}, e^{j\phi_{i,i}}, \ldots, e^{j\phi_{N_r-1,i}}\right) \prod_{l=i+1}^{N_r} G_{li}^T(\psi_{li}) \right] \right] \tilde{I}_{N_r \times N_c} \quad (1)$$

where $D_i(1_{i-1}, e^{j\Phi i,i}, \ldots, e^{j\Phi N_r^{-1,i}})$ is an $N_r \times N_r$ diagonal matrix $1_{i-1}$ denotes a sequence of ones of length i−1

$$G_{li}(\psi) = \begin{pmatrix} I_{i-1} & 0 & 0 & 0 & 0 \\ 0 & \cos(\psi) & 0 & \sin(\psi) & 0 \\ 0 & 0 & I_{l-i-1} & 0 & 0 \\ 0 & -\sin(\psi) & 0 & \cos(\psi) & 0 \\ 0 & 0 & 0 & 0 & I_{N_r-l} \end{pmatrix}$$

represents an $N_r \times N_r$.

Givens rotation matrix $\tilde{I}_{N_r \times N_c}$ is an identity matrix padded with zeros to fill the additional rows or columns when $N_r \neq N_c$.

Hence V is represented by $N_a/2$ angles $\{\phi\}$ in the range $[0,2\pi)$ and $N_a/2$ angles $\{\psi\}$ in the range $[0,\pi/2]$, with $$N_a = \sum_{i=1}^{\min\{N_c,N_r-1\}} 2(N_r - i) \quad (2)$$

$$= \min\{N_c, N_r - 1\}(2N_r - \min\{N_c, N_r - 1\} - 1)$$

$$= N_c(2N_r - N_c - 1).$$

In one embodiment the compressed feedback comprises one message referred to below as feedback 1. In another embodiment, the compressed feedback comprises two messages, the first being feedback 1 below and the second feedback 2 described below.

Figure 2:
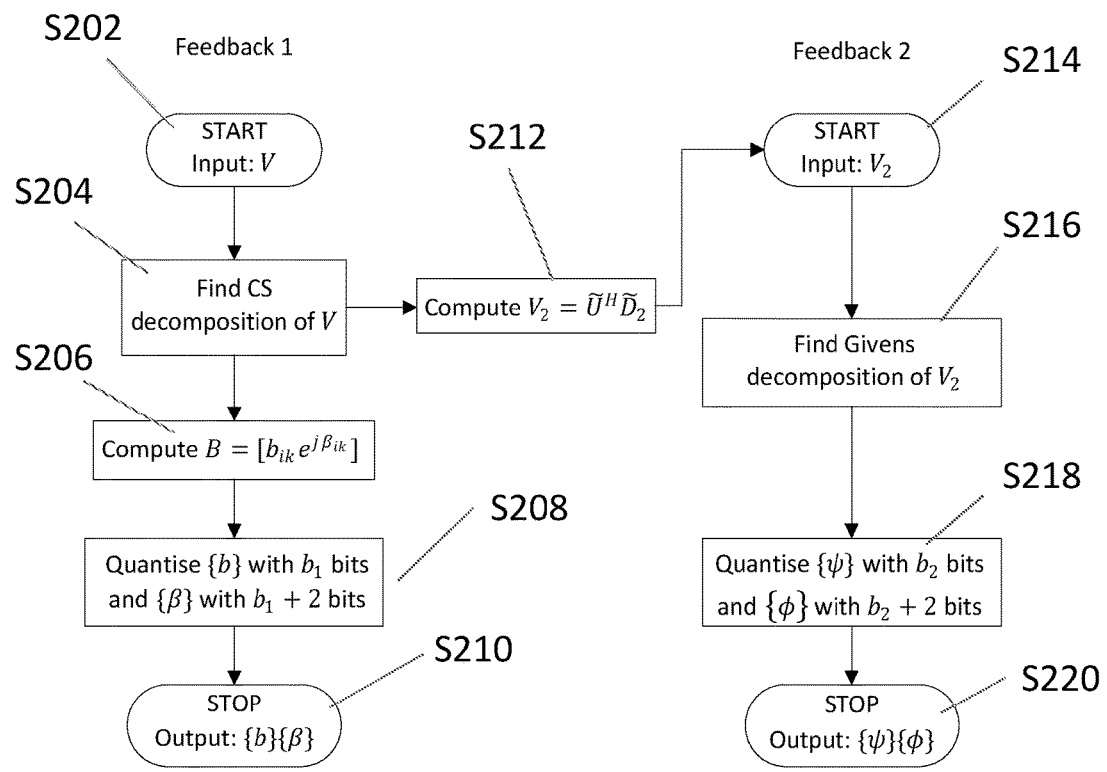
FIG. 2 shows a method carried out by a beamformee device according to an embodiment.

FIG. 2 is a flowchart showing methods carried out by a beamformee in an embodiment.

The method starts in step S202 in which the input is a the beamforming feedback matrix V.

In feedback 1 the beamformee firstly finds a representation of the matrix $V_1 = V\tilde{U}$, where $\tilde{U}$ is a convenient unitary matrix of dimensions $N_c \times N_c$ that minimises the number of angular coefficients required to represent $V_1$. In other words $\tilde{U}$ satisfies the following optimisation problem where the orthonormal column beamforming matrix V is given and $$\left\{b_1, \ldots, b_{\frac{N_b}{2}}\right\}, \left\{\beta_1, \ldots, \beta_{\frac{N_b}{2}}\right\}$$

denote the parameters used for a lossless representation of $V_1$ $$\min_{\tilde{U}, f(\cdot)} N_b$$

subject to: $V_1 = V\tilde{U} = f\left(b_1, \ldots, b_{\frac{N_b}{2}}, \beta_1, \ldots, \beta_{\frac{N_b}{2}}\right)$ $U^H U = U U^H = I_{N_c}$ $b_i \in [0, \pi/2], i = 1, \ldots, \frac{N_b}{2}$ $\beta_i \in [0, 2\pi), i = 1, \ldots, \frac{N_b}{2}$ Note that the map $f(\cdot)$ is also an unknown in the optimisation problem. The last two constraints in the problem fix the range of the real coefficients in the representation, which are the same as the angles in the Givens decomposition.

This new feedback matrix spans the same vector subspace as V, which is the most important information the beamformer needs to spatially separate users in DL-MU MIMO. However, $V_1$ can be represented with fewer coefficients than V as we shall see hereafter.

In step S204, the beamformee finds the cosine-sine (CS) decomposition (thin version) of V, which can be written as $$(V \ V_\perp) = \begin{pmatrix} Q_1 & 0 & 0 \\ 0 & Q_{21} & Q_{22} \end{pmatrix} \begin{pmatrix} \cos\Theta & -\sin\Theta & 0 \\ \sin\Theta & \cos\Theta & 0 \\ 0 & 0 & I \end{pmatrix} \begin{pmatrix} T_1 & 0 & 0 \\ 0 & T_{21} & T_{22} \end{pmatrix}^H$$

In step S206, the beamformee computes a matrix B. The matrix B forms the compressed representation of $V_1$ and has dimensions: $\max\{N_c, N_r - N_c\} \times \min\{N_c, N_r - N_c\}$.

$$B = Q_{21} \Theta Q_1^H \triangleq \begin{pmatrix} b_{1,1} e^{j\beta_{1,1}} & \cdots & b_{1,min} e^{j\beta_{1,N_c}} \\ \vdots & \ddots & \vdots \\ b_{max,1} e^{j\beta_{N_r-N_c,1}} & \cdots & b_{max,min} e^{j\beta_{R,N_r-N_c,N_c}} \end{pmatrix}.$$

In step S208, the beamformee quantises $\{b\}$ and $\{\beta\}$. Note that, because the elements forming the diagonal matrix $\theta = \text{diag}(\theta_1, \ldots, \theta_{N_\theta})$ are principal angles defined in $[0, \pi/2]$, the amplitude of the elements of B is bounded by $\pi/2$, i.e., $b_{ik} \in [0, \pi/2]$.

Therefore, the elements of B can be represented by $N_b/2$ angles $\{\beta\}$ in the range $[0, 2\pi)$ and $N_b/2$ magnitude values $\{b\}$ in $[0, \pi/2]$ that can be viewed as angular parameters, with $$N_b = 2(N_r - N_c)N_c. \quad (3)$$

If only feedback 1 is being calculated, the method stops in step S210 and the quantised values $\{b\}$ and $\{\beta\}$ are output.

It is possible for the beamformee to send an addendum of information, feedback 2, which combined with feedback 1 allows the beamformer to reconstruct V (up to some irrelevant column phase shifts). This is shown in the right hand side of FIG. 2. In step S212, the beamformee computes the matrix $$V_2 = \tilde{U}^H \tilde{D}_2$$

where
$\tilde{U}$ is a unitary matrix of dimensions $N_c \times N_c$ obtained as follows $$\tilde{U} = \begin{cases} T_1 Q_1^H, & N_c \leq \frac{N_r}{2} \\ T_{21} Q_{21}^H + T_{22} Q_{22}^H, & N_c > \frac{N_r}{2} \end{cases}.$$

$\tilde{D}_2 = \text{diag}(e^{j\delta_1}, \ldots, e^{j\delta_{N_c}})$ is a column-wise diagonal matrix such that the last row of $V_2$ has real nonnegative values.

The start of the method of feedback 2, is step S214 and the input to the method is the matrix $V_2$.

In step S216 the beamformee applies the Givens decomposition (1) to the matrix $$V_2 = \tilde{U}^H \tilde{D}_2$$

Therefore we can represent $V_2$ by $N_a'/2$ angles $\{\phi\}$ in the range $[0, 2\pi)$ and $N_a'/2$ angles $\{\psi\}$ in the range $[0, \pi/2]$, with $$N_a' = N_c(N_c - 1). \quad (4)$$

In step S218, $\{\psi\}$ and $\{\phi\}$ are quantised by the beamformer. The output of the method of feedback 2 is the quantised values of $\{\psi\}$ and $\{\phi\}$ in step S220.

Figure 3:
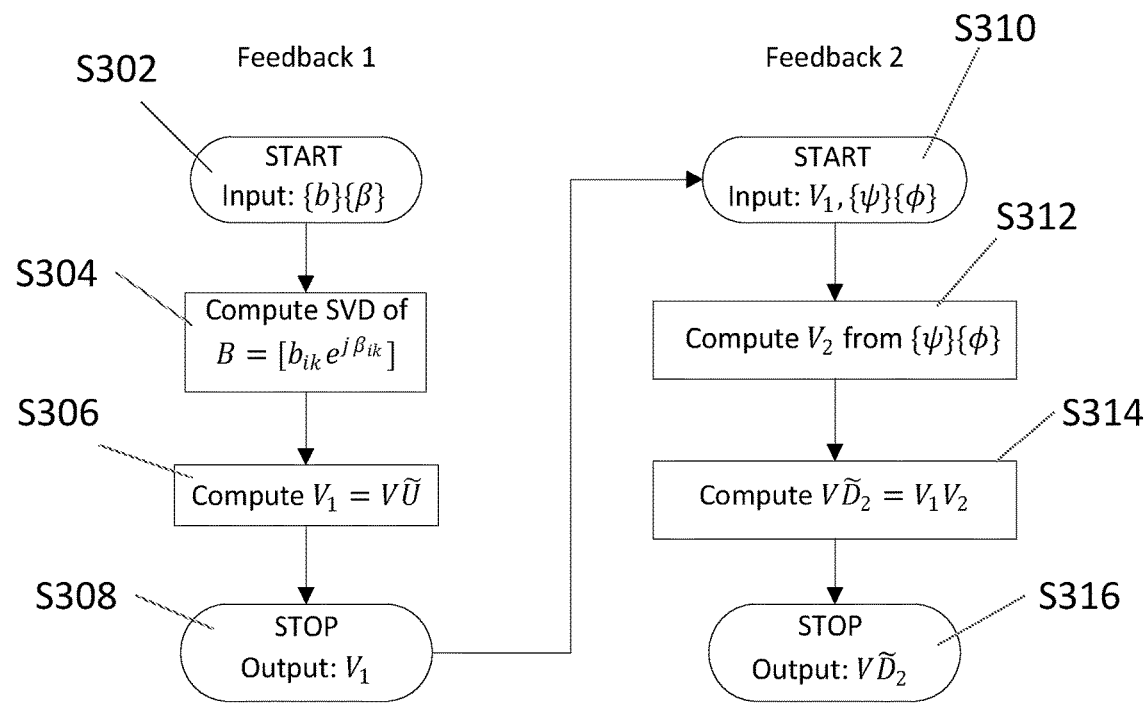
FIG. 3 shows a method carried out by a beamformer device according to an embodiment.

FIG. 3 is a flowchart showing the methods carried out by a beamformer according to an embodiment to reconstruct the feedback matrix $V_1$ and the beamforming feedback matrix $V\tilde{D}_2$.

In step S302, the beamformer receives the quantised values of $\{b\}$ and $\{\beta\}$. In step S304 the beamformer computes the Singular Value Decomposition (SVD) of B:

$$B = (\tilde{Q}_{21} \ \tilde{Q}_{22}) \begin{pmatrix} \Theta \\ 0 \end{pmatrix} \tilde{Q}_1^H$$

In step S306, the beamformer reconstructs $V_1$ as follows $$V_1 = V\tilde{U} = \begin{cases} \begin{pmatrix} \tilde{Q}_1 \cos\Theta \tilde{Q}_1^H \\ \tilde{Q}_{21} \sin\Theta \tilde{Q}_1^H \end{pmatrix}, & N_c \leq \frac{N_r}{2} \\ \begin{pmatrix} -\tilde{Q}_1 \sin\Theta \tilde{Q}_{21}^H \\ \tilde{Q}_{21} \cos\Theta \tilde{Q}_{21}^H + \tilde{Q}_{22} \tilde{Q}_{22}^H \end{pmatrix}, & N_c > \frac{N_r}{2} \end{cases}.$$

The output of the method of feedback 1 in step S308 is the feedback matrix $V_1$.

In an embodiment, the beamformee also transmits the quantised values of $\{\psi\}$ and $\{\phi\}$ to the beamformer. A method of recovering the beamforming matrix is shown on the right hand side of FIG. 3.

The inputs to the feedback 2 method in step S310 are the feedback matrix $V_1$ and the quantised values of $\{\psi\}$ and $\{\phi\}$.

In step S312 the beamformer computes $V_2$ from the quantised values $\{\psi\}$ and $\{\phi\}$. In step S314 the beamformer can reconstruct the beamforming feedback matrix by combining the two feedback messages $V_1 V_2 = V\tilde{D}_2$.

In step S316, the output from the method is $V\tilde{D}_2$.

Note that the number and range of the parameters needed for feedback 1 and 2 together equal those of conventional 802.11n/ac compressed feedback.

Table 1 below shows a comparison between the proposed compressed feedback in terms of the nature of the beamforming feedback matrix and the number and range of feedback parameters.

TABLE 1

| | Beamforming feedback matrix | Number and range of feedback parameters |
|---|---|---|
| Proposed feedback 1 | $V\tilde{U}$, $(N_r \times N_c)$ with $\tilde{U}$ unitary matrix | $N_b = 2(N_r - N_c)N_c$ |
| | | $N_b/2$ in $[0, 2\pi)$ |
| | | $N_b/2$ in $\left[0, \frac{\pi}{2}\right]$ |
| Proposed feedback 1 + 2 | $V$, $(N_r \times N_c)$ with fixed column-wise phase shifts | $N_a = N_c(2N_r - N_c - 1)$ |
| | | $N_a/2$ in $[0, 2\pi)$ |
| | | $N_a/2$ in $\left[0, \frac{\pi}{2}\right]$ |

One advantage of the proposed feedback is that the feedback 1 message contains fewer parameters than the Givens representation and yet it can deliver more accurate information of the user spatial separation.

This can be seen by comparing the distortion of Givens representation to that of feedback 1 in terms of arc length. Arc length is a measure of distance between subspaces given by $(\Sigma_{i=1}^{N_c} \theta_i^2)^{1/2}$ where $\{\theta_i\}$ are the principal angles between two subspaces.

Figure 4:
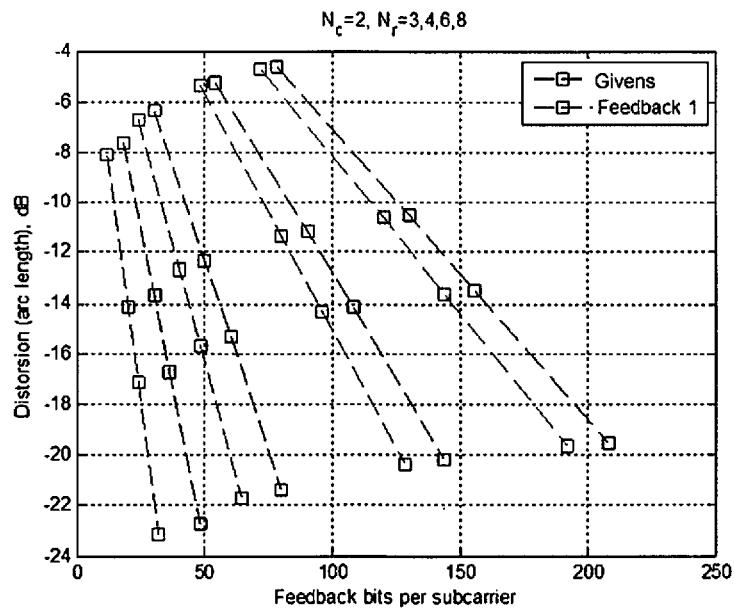
FIG. 4 shows arc length distortion for a method according to an embodiment.

FIG. 4 shows the arc length distortion for the Givens representation and the proposed feedback 1 for Rayleigh fading uncorrelated channel and $N_r=3,4,6,8$ transmit antennas. The number of spatial streams is $N_c=2$. The parameters of the two representations are quantised and the markers indicate the four possible resolutions as set out below.

SU low resolution: 2/4 bits for parameters in $[0,\pi/2]$ and $[0,2\pi)$, respectively SU high resolution: 4/6 bits for parameters in $[0,\pi/2]$ and $[0,2\pi)$, respectively MU low resolution: 5/7 bits for parameters in $[0,\pi/2]$ and $[0,2\pi)$, respectively MU high resolution: 7/9 bits for parameters in $[0,\pi/2]$ and $[0,2\pi)$, respectively.

Figure 5:
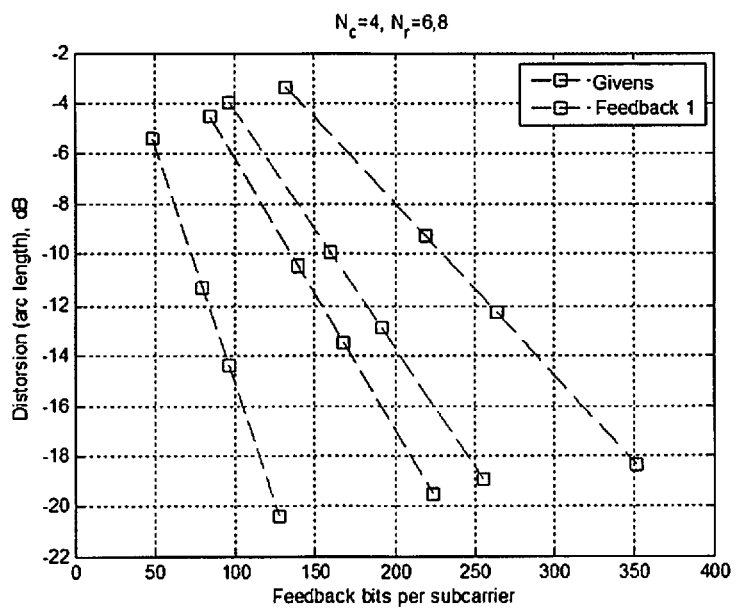
FIG. 5 shows arc length distortion for a method according to an embodiment.

FIG. 5 shows the arc length distortion comparison in the case of 4 layers for $N_r=6,8$ transmit antennas. As shown in FIG. 5, the distortion is lower under feedback 1 than when using Givens feedbacks for a fixed number of transmit antennas. Thus feedback 1 requires less feedback bits per subcarrier than feedback using the Givens decomposition.

Another advantage of the proposed feedback in embodiments is that a feedback 1 message can be combined with an additional message, feedback 2, to form a representation of the beamforming feedback matrix V that is equivalent to the Givens representation. This may be useful when the beamformer wants to find the steering matrix in SU-MIMO mode, as the directions of the strongest spatial singular vectors are added to the information of the range space. The representation obtained by combining feedback 1 and 2 provides virtually the same accuracy in terms of Euclidean distortion as the Givens representation.

The proposed feedback 1 allows a reduction in the size of the compressed feedback message compared to compressed feedback based on Givens rotations. Feedback 1 also provides the beamformer with more accurate knowledge about the spatial separation of the beamformees, which is crucial in the calculation of the steering matrix for MU MIMO transmissions.

Additionally, feedback 2 provides some extra information that combined with feedback 1 allows the beamformer to reconstruct the individual vector components of the beamforming feedback matrix, which may be useful primarily for SU MIMO operations.

One further advantage is that both feedback 1 and 2 are expressed in the same format, i.e., angular coefficients, as the current 802.11n/ac compressed feedback.

Figure 6:
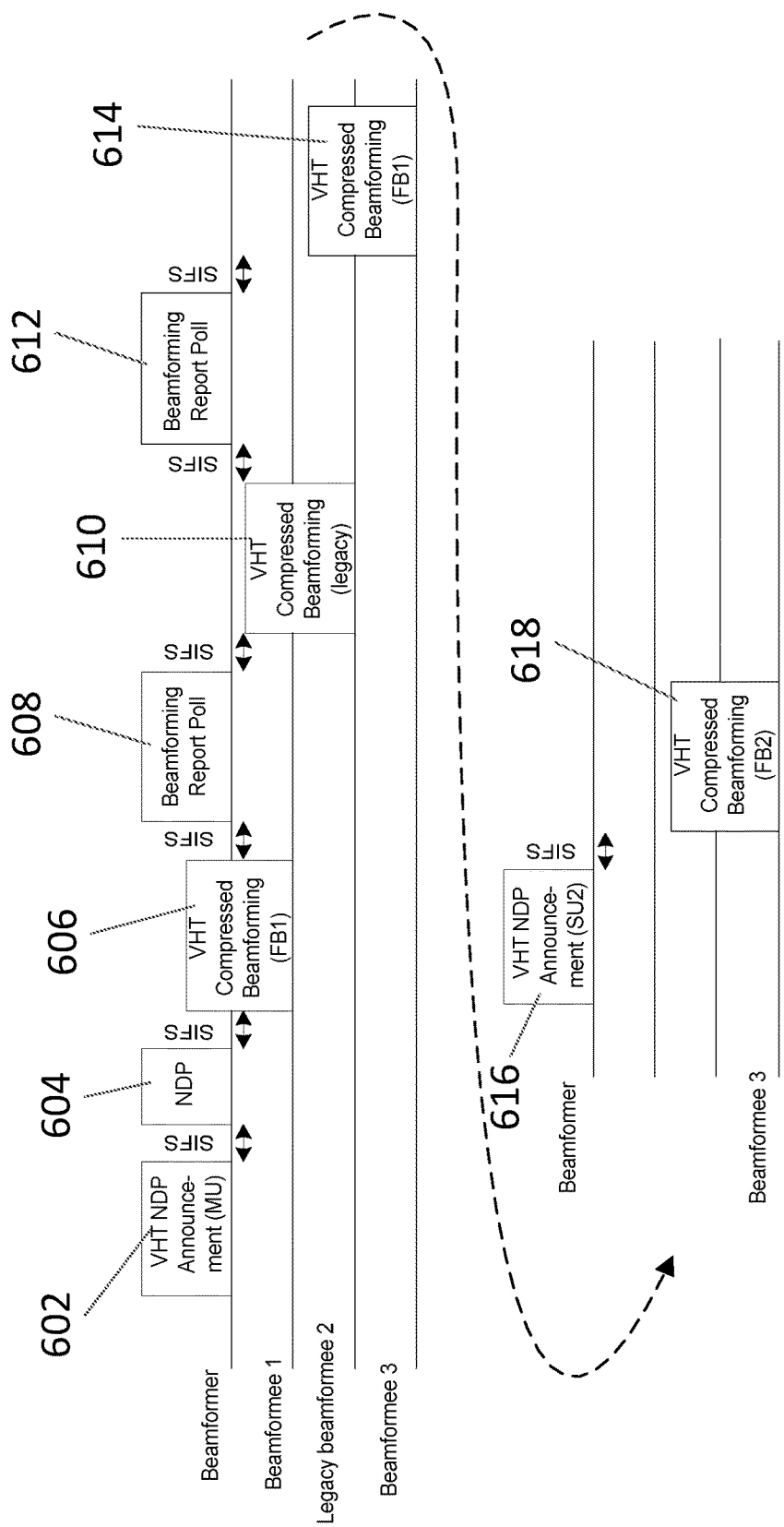
FIG. 6 shows a communication protocol according to an embodiment.

The sounding protocol used by the beamformer in an embodiment to solicit the new feedback reports from the beamformees is shown in FIG. 6.

FIG. 6 shows an example of how the sounding procedure may work in an 802.11 very high throughput (VHT) MIMO transmission. The beamformer is capable of recognising both the legacy compressed feedback (as in 802.11ac) and the new compressed feedback.

The beamformer broadcasts a non-data packet (NDP) announcement 602 that signals the relevant beamformees a request for feedback with feedback type set to multi-user (MU). After broadcasting the announcement, the beamformer waits for a Short Interframe Space (SIFS). The NDP announcement is followed by a sounding packet 604 that allows the beamformees to measure the channel and form the feedback report.

Beamformee 1 responds with a compressed feedback 1 message 606. Following a SIFS, the Beamformer broadcasts a beamforming report poll 608. Legacy beamformee 2 responds with a legacy compressed beamforming message 610. Following a SIFS, the Beamformer broadcasts a beamforming report poll 612. Then beamformee 3 responds with a compressed feedback 1 message 614.

Beamformee 1 and 3 in the example respond with a compressed feedback 1 message, whilst the legacy beamformee 2 sends a conventional IEEE802.11ac compressed feedback. Note that the beamformees capable of reporting the new compressed feedback include in the feedback message an indication of which type of feedback is reported.

Once the feedback reports have been received, the beamformer is able to check the spatial separation of the three users; in the example the beamformer decides that this separation is not enough to support MU transmission and opts instead for SU MIMO transmission to beamformee 3.

Then the beamformer broadcasts another NDP announcement 616 of feedback type SU 2, to which beamformee 3 replies by sending feedback 2 message 618. Note that this new type of SU announcement is not followed by a sounding packet because feedback 2 is calculated by beamformee 3 from the previous channel measurement.

Figure 7:
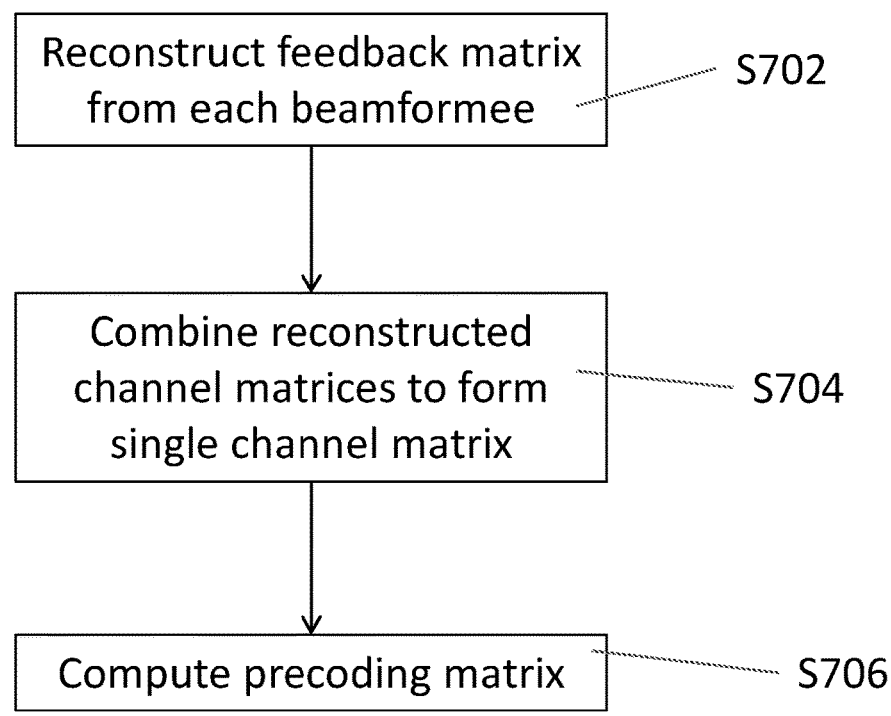
FIG. 7 shows a method in a beamformer of calculating a precoding matrix according to an embodiment.

FIG. 7 shows a method in a beamformer of calculating a precoding matrix according to an embodiment. The beamformer may calculate the DL-MU-MIMO steering matrix also known as the precoding matrix from the information received by the beamformees.

In step S702, the beamformer reconstructs the feedback matrix from each of the beamformees. Assume that the beamformer has scheduled beamformees $u_1, \ldots, u_{N_u}$ for transmission and denote by $$\tilde{V}_{u_1}, \ldots, \tilde{V}_{u_{N_u}}$$

their respective feedback matrix reconstructed by the beamformer from feedback 1 or feedback 2, i.e., the output of step S308 or step S316 shown in FIG. 3. The beamformees may also report a measure of quality (amplitude) for each of the reported feedback vector, $Y_{u_1}, \ldots, Y_{u_{N_u}}$, so the beamformer may reconstruct the beamformees' channels as $$\tilde{H}_{u_1} = \tilde{V}_{u_1} \mathrm{diag}\left(\sqrt{\gamma_{u_1}}\right), \ldots, \tilde{H}_{u_{N_u}} = \tilde{V}_{u_{N_u}} \mathrm{diag}\left(\sqrt{\gamma_{u_{N_u}}}\right).$$

In step S704, beamformer combines the reconstructed channels of the scheduled users in a single channel matrix:

$$\tilde{H} = [\tilde{H}_{u_1}, \ldots, \tilde{H}_{u_{N_u}}]^H$$

In step S706, the beamformer uses the combined channel matrix to compute the precoding matrix G, such that the transmit signal on a general subcarrier at a general time sample is given by x=Gu where u contains the user data symbols.

The precoder G calculation can be done in many ways. As an example, if we want to use a zero-forcing design, which removes all inter stream interference, with a maximum transmit power P and a fairness strategy that ensures the same SINRs for all users, the precoder is given by G=$\tilde{H}^\dagger \sqrt{\gamma}$ where $\tilde{H}^\dagger = \tilde{H}^H (\tilde{H}\tilde{H}^H)^{-1}$ is the pseudo-inverse of the channel and $$\gamma = \frac{P}{\mathrm{trace}\left\{\left(\tilde{H}\tilde{H}^H\right)^{-1}\right\}}$$

An advantage of a sounding protocol according to an embodiment is to reduce the amount of feedback reported by the users in an MU sounding procedure whilst at the same time increasing the accuracy with which their spatial separation is known by the beamformer by using the new feedback 1 compressed message.

The specific embodiments are presented schematically. The reader will appreciate that the detailed implementation of each embodiment can be achieved in a number of ways. For instance, a dedicated hardware implementation could be designed and built. On the other hand, a processor could be configured with a computer program, such as delivered either by way of a storage medium (e.g. a magnetic, optical or solid state memory based device) or by way of a computer receivable signal (e.g. a download of a full program or a "patch" update to an existing program) to implement the management unit described above in relation to the embodiments. Besides these two positions, a multi-function hardware device, such as a DSP, a FPGA or the like, could be configured by configuration instructions.

While certain embodiments have been described, these embodiments have been presented by way of example only, and are not intended to limit the scope of the inventions. Indeed, the novel method and devices described herein may be embodied in a variety of other forms; furthermore, various omissions, substitutions and changes in the methods and devices described herein may be made without departing from the spirit of the inventions. The accompanying claims and their equivalents are intended to cover such forms or modifications as would fall within the scope and spirit of the inventions.

The invention claimed is:

1. A method of feeding back a compressed beamforming feedback matrix from a beamformee device to a beamformer device, the method comprising:
   receiving, at a plurality of antennas of the beamformee device, signals from the beamformer device;
   constructing a beamforming feedback matrix, V, from a singular value decomposition of a channel estimation matrix constructed using the signals received by each of the plurality of antennas of the beamformee device; and
   determining a first feedback matrix, $V_1$, that spans the vector subspace of the beamforming feedback matrix, V, wherein determining the first feedback matrix, $V_1$, comprises:
      determining the product of the beamforming feedback matrix, V, with a unitary matrix, $\tilde{U}$, optimised to minimise a number of coefficients required to represent the beamforming feedback matrix, V, such that $V_1$=V*$\tilde{U}$;
      compressing the first feedback matrix, $V_1$, into a plurality of coefficients, wherein compressing the first feedback matrix, $V_1$, into a plurality of coefficients comprises determining a cosine-sine decomposition of the first feedback matrix, $V_1$ decompose the first feedback matrix, $V_1$, into a plurality of angular coefficients; and
   transmitting an indication of the plurality of coefficients to the beamformer device.

2. The method according to claim 1, further comprising transmitting an indication of the unitary matrix, $\tilde{U}$, to the beamformer device.

3. The method according to claim 2, further comprising determining the indication of the unitary matrix, $\tilde{U}$, as a Givens decomposition of the product of the Hermitian transpose of the unitary matrix, $\tilde{U}$, with a diagonal matrix.

4. A non-transitory computer readable medium carrying processor executable instructions which when executed on a processor cause the processor to carry out a method according to claim 1.

5. A beamformee device comprising
a plurality of antennas configured to receive signals from a beamformer device, and transmit an indication of a plurality of coefficients to the beamformer device;
the beamformee device being configured to:
   construct a beamforming feedback matrix, V, from a singular value decomposition of a channel estimation matrix constructed using the signals received by each of the plurality of antennas of the beamformee device;
   determining a first feedback matrix, $V_1$, that spans the vector subspace of the beamforming feedback matrix, V,
   wherein determining the first feedback matrix, $V_1$, comprises:
      determining the product of the beamforming feedback matrix, V, with a unitary matrix, $\tilde{U}$, optimised to minimise a number of coefficients required to represent the beamforming feedback matrix, V, such that $V_1=V*\tilde{U}$; and
      compressing the first feedback matrix, $V_1$, into the plurality of coefficients, wherein compressing the first feedback matrix, $V_1$, into a plurality of coefficients comprises determining a cosine-sine decomposition of the first feedback matrix, $V_1$ to decompose the first feedback matrix, $V_1$, into a plurality of angular coefficients.

6. The beamformee device according to claim 5, wherein the plurality of antennas are further configured to transmit an indication of the unitary matrix, $\tilde{U}$, to the beamformer device.

7. The beamformee device according to claim 6 configured to determine the indication of the unitary matrix, $\tilde{U}$, as a Givens decomposition of the product of the Hermitian transpose of the unitary matrix, $\tilde{U}$, with a diagonal matrix.

8. A method, in a beamforming device of reconstructing a feedback matrix, $V_1$, the method comprising:
   receiving, from a beamformee device, an indication of a plurality of coefficients, wherein the beamformee device is configured to determine a product of a beamforminq feedback matrix, V, with a unitary matrix, $\tilde{U}$, optimized to minimize a number of coefficients required to represent the beamforminq feedback matrix, V, such that $V_1=V\times\tilde{U}$, and the beamformee device is configured to compress the first feedback matrix, $V_1$, into the plurality of coefficients by determining a cosine-sine decomposition of the first feedback matrix, $V_1$ to decompose the first feedback matrix, $V_1$, into a plurality of angular coefficients; and
   determining from the plurality of coefficients the first feedback matrix, $V_1$.

9. A beamforming method comprising:
   reconstructing, according to the method of claim 8, a beamforming feedback matrix, V, for each of a plurality of beamformee devices;
   combining the reconstructed beamforming feedback matrices, V, to form a channel matrix;
   determining a precoding matrix from the channel matrix; and
   transmitting signals to the beamformee devices using the precoding matrix.

10. The method according to claim 8, further comprising, receiving an indication of the unitary matrix, $\tilde{U}$, from the beamformee device.

11. A non-transitory computer readable medium carrying processor executable instructions which when executed on a processor cause the processor to carry out a method according to claim 8.

12. A beamforming device comprising:
   a plurality of antennas configured to receive, from a beamformee device, a signal comprising an indication of a plurality of coefficients, wherein the beamformee device is configured to determine a product of a beamforminq feedback matrix, V, with a unitary matrix, $\tilde{U}$, optimized to minimize a number of coefficients required to represent the beamforminq feedback matrix, V, such that $V_1=V\times\tilde{U}$, and the beamformee device is configured to compress the first feedback matrix, $V_1$, into the plurality of coefficients by determining a cosine-sine decomposition of the first feedback matrix, $V_1$ to decompose the first feedback matrix, $V_1$, into a plurality of angular coefficients;
   wherein the beamforming device is configured to determine from the plurality of coefficients the first beamforming feedback matrix, $V_1$.

13. The beamforming device according to claim 12, wherein the beamforming device is further configured to:
   reconstruct a beamforming feedback matrix, V, for each of a plurality of beamformee devices;
   combine the reconstructed beamforming feedback matrices, V, to form a channel matrix;
   determine a precoding matrix from the channel matrix; and
   transmit signals to the beamformee devices using the plurality of antennas according to the precoding matrix.

* * * * *